United States Patent
Beer et al.

(10) Patent No.: US 8,811,818 B2
(45) Date of Patent: Aug. 19, 2014

(54) OPTICAL TRANSMISSION SYSTEM

(75) Inventors: Stephan Beer, Erlangen (DE); Ansgar Dirkmann, München (DE); Thomas Nagel, Boca Raton, FL (US)

(73) Assignee: Adtran GmbH, Berlin-Siemensstadt (DE)

( * ) Notice: Subject to any disclaimer, the term of this patent is extended or adjusted under 35 U.S.C. 154(b) by 975 days.

(21) Appl. No.: 11/885,815

(22) PCT Filed: Mar. 6, 2006

(86) PCT No.: PCT/EP2006/060481
§ 371 (c)(1),
(2), (4) Date: Jun. 6, 2008

(87) PCT Pub. No.: WO2006/094960
PCT Pub. Date: Sep. 14, 2006

(65) Prior Publication Data
US 2009/0052893 A1    Feb. 26, 2009

(30) Foreign Application Priority Data
Mar. 8, 2005   (DE) .................. 10 2005 010 610

(51) Int. Cl.
    *H04B 10/00*       (2013.01)
(52) U.S. Cl.
    USPC .......................................... 398/59; 398/66
(58) Field of Classification Search
    USPC .................................................. 398/58–64
    See application file for complete search history.

(56) References Cited

U.S. PATENT DOCUMENTS

| | | | | |
|---|---|---|---|---|
| 5,943,148 A | * | 8/1999 | Hamel et al. | 398/83 |
| 6,426,815 B1 | * | 7/2002 | Koehler | 398/59 |
| 6,643,464 B1 | * | 11/2003 | Roorda et al. | 398/59 |
| 6,681,083 B1 | | 1/2004 | Koonen | |
| 6,728,484 B1 | | 4/2004 | Ghani | |
| 6,947,670 B1 | * | 9/2005 | Korotky et al. | 398/59 |
| 7,031,608 B2 | * | 4/2006 | Chiaroni et al. | 398/79 |
| 7,206,508 B2 | * | 4/2007 | Sharma et al. | 398/4 |
| 7,321,729 B2 | * | 1/2008 | Gumaste et al. | 398/59 |

(Continued)

FOREIGN PATENT DOCUMENTS

DE    19714650 A1    10/1998
JP     7202921 A      8/1995

(Continued)

OTHER PUBLICATIONS

Gerry Pesavento Senior, Mark Kelsey; "Gigabit Ethernet Passive Optical Networks"; [Retrieved from Internet on Sep. 4, 2007]; pp. 1-15; Alloptic Inc., Livermore, CA.

(Continued)

*Primary Examiner* — Agustin Bello
(74) *Attorney, Agent, or Firm* — Laurence A. Greenberg; Werner H. Stemer; Ralph E. Locher

(57) ABSTRACT

An optical transmission system comprises a metropolitan core network operated in a wavelength division multiplexing mode and connected via metro connection devices to access connections to optical network terminals connected by means of a passive optical splitter. The metro connection devices contain regenerators and wavelength converters, so that data regeneration takes place between the network terminals and the central management and switching unit. This makes it possible to cover distances around 100 km.

10 Claims, 2 Drawing Sheets

(56) References Cited

U.S. PATENT DOCUMENTS

| | | | |
|---|---|---|---|
| 7,548,695 B2* | 6/2009 | Wake | 398/71 |
| 7,599,620 B2* | 10/2009 | Graves et al. | 398/51 |
| 7,769,290 B2* | 8/2010 | Smith | 398/5 |
| 7,856,182 B2* | 12/2010 | Boden | 398/3 |
| 2003/0002776 A1 | 1/2003 | Graves et al. | |
| 2003/0228093 A1 | 12/2003 | Notani | |
| 2009/0052893 A1* | 2/2009 | Beer et al. | 398/42 |

FOREIGN PATENT DOCUMENTS

| | | |
|---|---|---|
| JP | 2001136188 A | 5/2001 |
| JP | 2001251252 A | 9/2001 |
| RU | 47154 | 8/2005 |
| RU | 2261530 C2 | 9/2005 |

OTHER PUBLICATIONS

I. Van De Voorde, C.M. Martin; I. Vandewege; X.Z. Oiu; "The SuperPON Demonstrator: An Exploration of Possible Evolution Path for Optical Access Networks"; IEEE Communications Magazine; Feb. 2000; vol. 38, Issue 2; Abstract—1 Page.

Iwatsuki et al., "Access and Metro Networks Based on WDM Technologies", Journal of Lightwave Technology, vol. 22, No. 11, Nov. 2004, pp. 2623-2630.

ITU-T G.984.1, Telecommunication Standardization Sector of ITU (Mar. 2003), Series G: Transmission Systems and Media, Digital Systems and Networks, Digital sections and digital line system—Optical line systems for local and access networks—Gigabit-capable Passive Optical Networks (GPON): General characteristics.

ITU-T G.984.2, Telecommunication Standardization Sector of ITU (Mar. 2003), Series G: Transmission Systems and Media, Digital Systems and Networks, Digital sections and digital line system—Optical line systems for local and access networks—Gigabit-capable Passive Optical Networks (GPON): Physical Media Dependent (PMD layer specification.

* cited by examiner

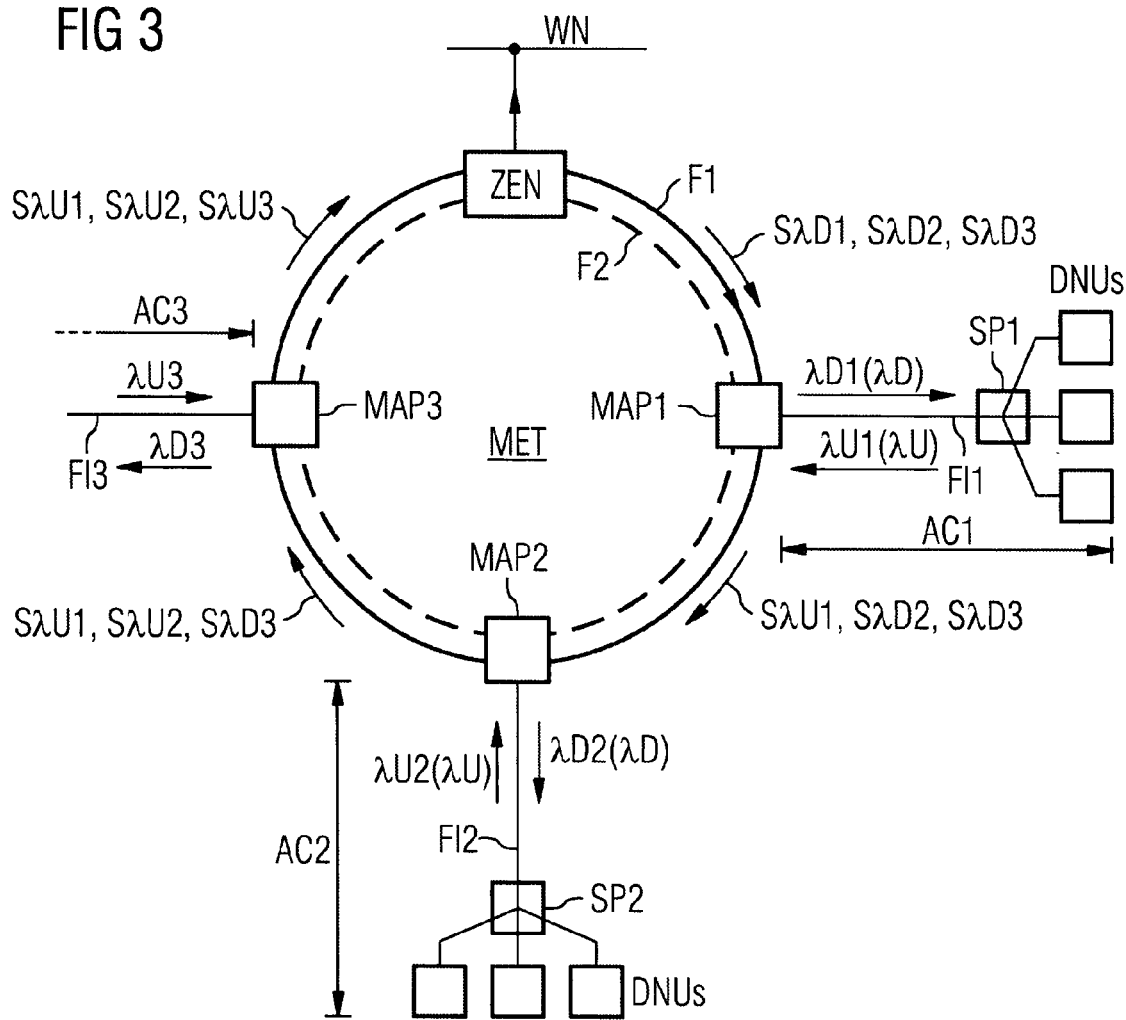

OPTICAL TRANSMISSION SYSTEM

CROSS REFERENCE TO RELATED APPLICATIONS

This application is the US National Stage of International Application No. PCT/EP2006/060481, filed Mar. 6, 2006 and claims the benefit thereof. The International Application claims the benefits of German application No. 102005010610.2 DE filed Mar. 8, 2005, both of the applications are incorporated by reference herein in their entirety.

FIELD OF INVENTION

The invention concerns an optical transmission system according to the independent claims.

BACKGROUND OF INVENTION

In optical networks, a distinction is drawn between wide area networks (Core networks), which are designed according to the SONET or SDH recommendations, and local loops or access networks. The access networks are designed as so-called Passive Optic Networks (PONs), in which the data transfer takes place in a first "wavelength channel" according to special PON protocols. In the "downstream direction", the transfer takes place in the time-division broadcast mode from an exchange, mostly labeled with "Optical Line Terminal—OLT", to a number of connected optical network terminals (ONU/ONT), which are individually addressed. "Upstream" the network terminals (ONU/ONT) split a second wavelength channel, in order likewise to send data to the exchange in the time-division operation in bursts or cells. The transmission capacity, called "bandwidth", between exchange and network terminal can be varied. The reference data, called payload, are transmitted e.g. in the "Asynchronous Transfer Mode" (ATM) or, for reasons of cost, according to the Ethernet recommendations. The main advantage of an Ethernet PON lies in the avoidance of complex and therefore expensive ATM or SONET elements. The development of these networks is represented in the article "Gigabit Ethernet Passive Optical Networks" by Gerry Pesavento Senior and Mark Kelsey, Alloptic Inc. Livermore, Calif. 94550.

In the patent US 2003/0002776, a transmission system with a mesh-shaped metro core network run in the wavelength multiplex mode is described. Attached to the metro core network are bidirectional access connections which, in contrast to the conventional PON networks, work in the wavelength multiplex mode and therefore necessitate a corresponding complexity of connection.

A further development of the system described for higher data rates is laid down as GPON in the ITU recommendations G984. Developments newer than "Super PON" are outlined in IEEE Communications Magazine, February 2000, pages 74 to 82 under the title "The SuperPON Demonstrator: An Exploration of Possible Evolution Path for Optical Access Networks". The goal of the development is both to expand the scope of these access networks and to enlarge the number of possible user connections. A simplification is thereby reached, in that so-called access nodes "Narrow Band Switches" are relocated from the access area to the Core network (FIG. 1, FIG. 2). However, the access area features active (amplified) splitter devices as before, which provide the optical network terminals (ONT/ONO) with sufficient optical capacity.

Moreover, the network described here also features the following disadvantages: in the access area optical regenerators—Optical Repeater Units (ORUs)—are required; the regenerators installed there are to be maintained as active elements. The range is too small for larger network structures in the metro area and in the purely passive area (indicated in FIG. 2 with "drop (10 km)").

SUMMARY OF INVENTION

It is therefore the task of the invention to specify an optical transmission system with a large range and a simple construction.

Such a system is specified in independent claims.

Advantageous further developments of the invention are specified in the dependent claims.

In this transmission system a distinction is drawn between metro area and access area, or rather metro core area and access connections. In the points of intersection between metro area and access area metro connection devices with regenerators and/or wavelength converters are inserted. These contain regenerators (amplifiers) for the downstream and upstream direction, through which the range through between a management and switching centre and the network terminals is substantially enlarged.

Only in the metro area up to the metro connection devices is an electricity supply also necessary. As active components are only present in this area, maintenance jobs likewise confine themselves practically to this area. The access connection between the metro connection points and the optical network terminals (ONUs/ONTs) are, in contrast, designed to be purely passive and therefore need no maintenance.

In the metro area, the transmission takes place advantageously in the wavelength multiplex mode, so that formidable data volumes of a number of access connections can be transported. The management and switching centre concentrates the fundamental devices in a point, so that an expansion can also take place without problem. The supervision likewise is carried out from this centre.

The metro area is designed as a ring network, which achieves optimal area coverage with minimal expenditure. The operational security can be raised considerably through a protection ring with a second thread.

The same wavelengths are used for the same services on all access connections, so that unified optical network terminals can be used.

For reasons of expenditure, the transmission in the access area takes place bi-directionally over only one thread, such that different wavelengths are used for each direction of transmission in order to avoid reciprocative signal disruptions. In addition, a number of different services with different wavelengths can be transmitted over this thread.

As the network features a larger range than networks hitherto existing, a modified PON protocol regulates the data exchange.

BRIEF DESCRIPTION OF THE DRAWINGS

An exemplary embodiment of the invention is closer explained by means of figures.

FIG. 3 a variant of the transmission system.

DETAILED DESCRIPTION OF INVENTION

The transmission system consists of a metro core network MET with a management and switching centre ZEN and a number of access connections to optical network units ONUs. The management and switching centre ZEN can be somewhat compared with an expanded optical line terminal (OLT) in terms of function. A data transmission takes place bi-directionally between the management and switching centre ZEN and the network units ONUs according to a PON protocol.

Figure 1:
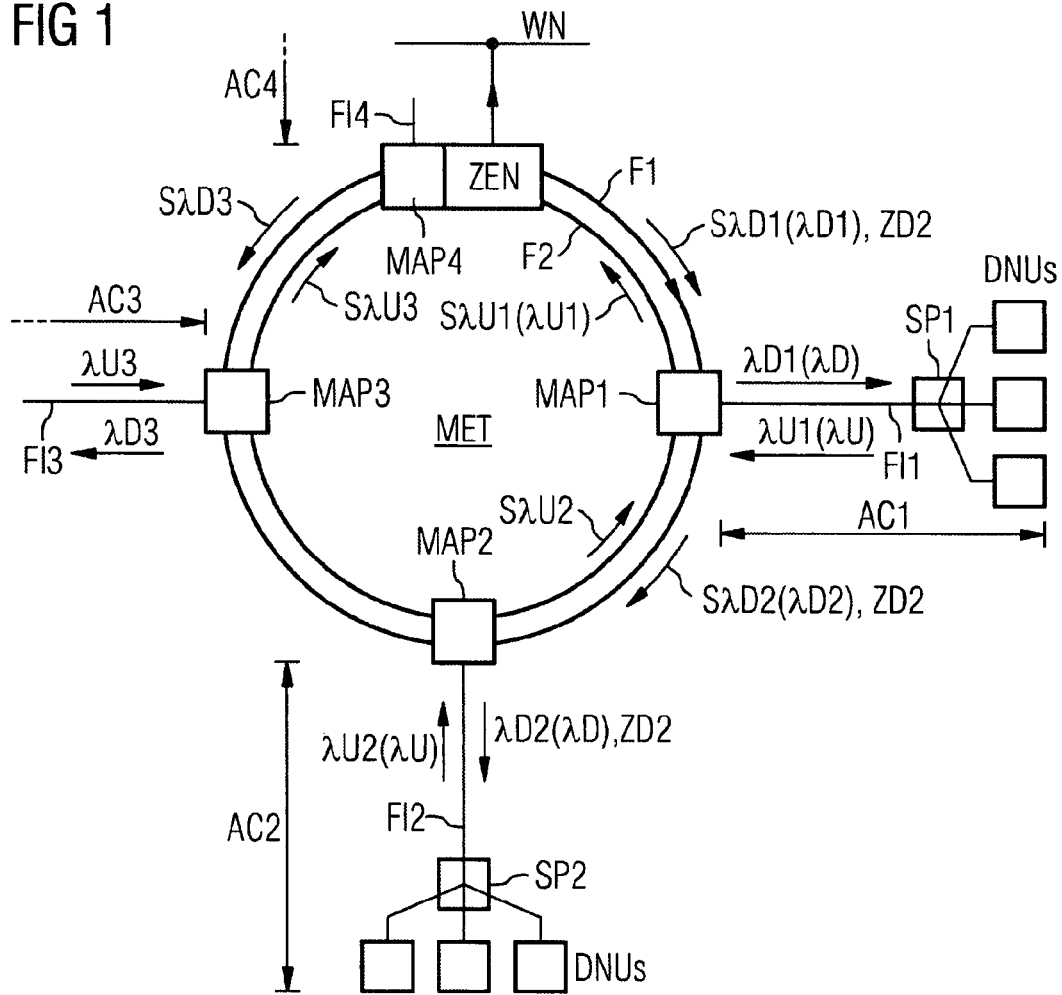
FIG. 1 shows a simplified diagram of the transmission system.

The metro core network MET is designed in FIG. 1 as a bi-directional ring network with two threads F1, F2. It can equally be constructed as a bi-directional ring network with one thread or as a unidirectional ring network with one or two threads. It can, however, also be a mesh network.

In the metro network MET according to FIG. 1, data are transferred bi-directionally between the management and switching centre ZEN up to different metro connection devices MAP1 to MAP3 in the wavelength multiplex mode. The transmission in the metro core network can hereby take place over one thread or—for example separately for every direction of transmission—over two threads. The use of a second thread contributes substantially to the raising of the operational security, as in the case of disruption the operation between the management and switching centre ZEN and each of the metro connection devices MAP1-MAP4 can be upheld through known equivalent network procedures.

Between the metro connection devices MAP1 to MAP3 of the metro core network MET and the optical network units ONUs (Optical Network Units ONUs or Optical Network Terminals ONTs) there exists in each case a purely passive optical "access connection", over which the data are likewise transmitted bi-directionally. The first access connection AC1 is instantiated by an access fiber optic cable FI1 attached to the metro connection device MAP1 and a passive splitter SP1, to which further connections of a number of optical network units ONUs are attached. The further access connections AC2-AC4 are constructed correspondingly. However the receive power at the disposal of the network units ONUs attached to it in each case is reduced by the splitters SP1, SP2, . . . in accordance with the splitting ratio. At the moment, a splitting ratio of around 1:100 is aimed at, whereby correspondingly high-performance lasers, or rather amplifiers, are provided in the metro connection devices and, if necessary, measures against disruptive non-linear effects must be taken. The subscriber units are attached to the network units ONUs—mostly after the optical-electrical conversion.

The transmission system is laid out in such a way that the access connections AC1-AC4 (only partially indicated in FIG. 1) contain no active elements. Solely the metro connection devices MAPs and the network units ONUs denote active elements and so electrical energy. The conventional transmission system, the metro core network, is also preferably laid out so that no amplifiers are necessitated between the metro connection devices MAP and the management and switching centre ZEN. Here also an equivalent network is of course possible with the use of two threads.

In the downstream direction (from the management and switching centre ZEN over a metro connection device MAP to the network units ONUs attached to it), the transmission of the data is carried out in the broadcast timesharing multiplex mode according to the ITU recommendations valid for passive optical networks, or rather according to modified recommendations in each case in a downstream pulse framework. This multiplex signal shall be called a metro downstream signal here. As a rule, a number of metro downstream signals S$\lambda$D1, S$\lambda$D2, S$\lambda$D3, . . . with different wavelengths $\lambda$D1, $\lambda$D2, $\lambda$D3, . . . (in FIG. 1 in brackets) are sent from the management and switching centre ZEN over a first thread F1 of the metro core network MET to the various metro connection devices MAP1, MAP2, MAP3, MAP4. These select (drop) in each case the appropriate "wavelength" for the attached access connection and then transform the wavelength of the selected metro downstream signal into the wavelength $\lambda$D (the same for all access connections) of the access downstream signals. So the metro downstream signal S$\lambda$D1 is selected in the first metro connection device MAP1 and transformed into an access downstream signal $\lambda$D$_1$. Otherwise, the signals remain unchanged, so that they are transmitted directly between the central management and switching centre ZEN and the optical network units ONUs. In a variant which is advantageous as regards cost, the downstream signals are simply amplified; their wavelengths, however, are retained. The individual broadband receive circuits attached over splitters of the network units ONUs accept these wavelengths. They are activated over different addresses and select the information specified for them. Should additional services be transmitted in another waveband, then a selection takes place based on wavelength for ONUs which, on the one hand, comprises all wavelengths $\lambda$D1, $\lambda$D2, $\lambda$D3, . . . of the operation between the management and switching centre ZEN, and on the other hand the other services.

In the upstream direction the transmission takes place—after one previous synchronization of the optical network terminal—in the timesharing multiplex mode likewise according to the ITU recommendations valid for passive optical networks, or rather according to modified ITU recommendations. The data blocks or data packets transmitted by the network units ONUs in time slots allocated particularly to them—featuring security holes if applicable—are summarized to a TDM signal and transferred in an upstream pulse framework. They can also contain information in addition to the payload (the data actually to be transmitted) relating to the signal quality, the required bandwidths, routing-information etc. The indication of bandwidths, or rather transmission capacity, can take place fixed, or alternatively dynamically in dependence on the requirements or priorities through the management and switching centre.

The metro downstream signals S$\lambda$D1, S$\lambda$D2, S$\lambda$D3, . . . can all be converted into access downstream signals of the same wavelengths $\lambda$D or transferred to the ONUs with unchangeable wavelengths. All access upstream signals $\lambda$U1, $\lambda$U2, $\lambda$U3, . . . , which are transmitted with the same wavelengths $\lambda$U on the access connections, must however be converted into metro upstream signals S$\lambda$U1, S$\lambda$U2, S$\lambda$U3, . . . converted with different wavelengths $\lambda$U1, $\lambda$U2, $\lambda$U3, which then are transmitted to the management and switching centre ZEN over a second thread F2 of the metro network MET. A "logical" conversion of the upstream signals likewise does not take place, they remain unchanged except for the wavelength. In short: the transmission between management and switching centre ZEN and the network units ONUs is carried out directly without logical transformations corresponding to the "PON" protocol used.

The management and switching centre ZEN is connected with a wide area network WAN or/and with other metro networks; over them run all connections, for example the connection between two ONUs attached to different access connections AC1 and AC2.

A number of different types of signals ZD$\lambda$ (additional services), of which only one ZD$\lambda$ is represented in FIG. 1, can be transmitted over the ring network and the access connections. Broadcast services can also be among them. Instead of an access signal given by way of example, e.g. $\lambda$D$_1$, then a bundle of different wavelengths are transmitted over the access connection. The different subscriber units are then attached to the network units ONUs by a wavelength demultiplexer.

The optical transmission system is conceived for the coverage of larger regions, i.e. through the metro network distances of around 70 km and through the access connection distances of around a further 30 km and more can be bridged. For this regenerators, preferably 3R regenerators, are provided in the metro connection devices MAP1, MAP2, MAP3 and regenerate the signals received relative to amplitude, pulse form and cycle. In the current prior art an optical-electrical conversion is required for this on the way in and on the way out an electrical-optical conversion is required. A metro connection device attached by the management and switching centre ZEN can be designed that much more easily, or rather the access connection AC4 can be directly attached to the management and switching centre.

Figure 2:
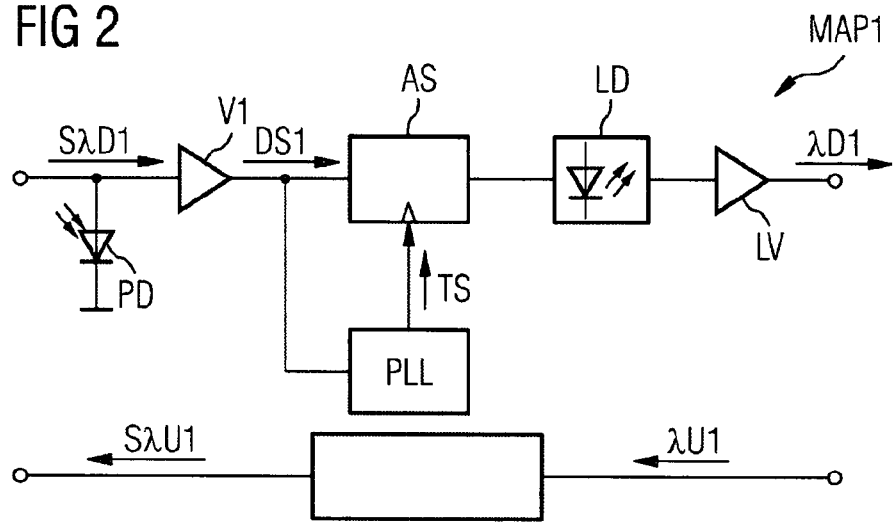
FIG. 2 a metro connection device.

The wavelength converter function in the metro connection device MAP is, as a rule, combined with an amplification function. FIG. 2 shows a principal design of a metro connection device MAP with optical-electrical-optical conversion. The optical metro downstream signal received, e.g. S$\lambda$D1, is converted by a photodiode PD into an electrical signal DS1 which is amplified by a reception amplifier V1. A phase servo loop PLL serves in cycle recovery. With the regenerated clock signal TS the electrical data signal DS is scanned in a scanning device AS. The scanned data signal, consequently regenerated as concerns cycle, modulates a laser diode LD generating the desired new wavelength. The downstream signal $\lambda D_1$ so generated is sent out over a power amplifier LV. Dependent on the data rate, the transmission distance including coupling and the quality of transmission and reception devices, a 3R regenerator can be eschewed if needs be for reasons of cost in the downstream direction at least, and simply an amplification provided.

For the upstream direction a regenerator assembly is likewise available. As a rule, in the upstream direction burst signals are received, which feature different gauges and different bit phases as well as signal pauses. For this reason, a regenerator assembly including the analogue receiver must be designed more elaborately. The regenerators should regenerate the data bursts as completely and as free of error as possible. The data regeneration can also be carried out here with (partially) optical regenerators, such that non-linear effects can also be used for the wavelength conversion. Often, a 3R regeneration will be necessary. In the upstream direction a point-to-point operation free of larger phase fluctuations can be instantiated with binary signals between connection device and management and switching centre ZEN. Of course, regeneration can be eschewed in the case of a metro connection device MAP4 arranged near to the management and switching centre ZEN.

As an alternative, in FIG. 3 a unidirectional ring network with a thread F1 and a number of metro connection devices MAP11-Map13 is represented, which are suited to unidirectional outward and inward coupling. The metro downstream signals S$\lambda$D1, S$\lambda$D2, S$\lambda$D3, . . . are selected according to their wavelength in the metro connection devices MAP11-MAP13, amplified and send on to the ONUs. In the upstream direction the burst signals $\lambda$U1, $\lambda$U2, $\lambda$U3, . . . are converted according to wavelength into metro upstream signals S$\lambda$U1, S$\lambda$U2, S$\lambda$U3, . . . , in each case with the same wavelengths as the selected metro downstream signals and coupled into the ring. The implementation seems at first to be simpler than in a bi-directional ring. Here also a second thread F2 (dashed) can be provided for reasons of protection, or the thread F1 run in both directions for protection reasons.

The invention claimed is:

1. An optical transmission system, comprising:
    a central management and switching device;
    a ring-shaped metro core network running in a wavelength multiplex mode, the ring-shaped metro core network including a plurality of wavelength-selective metro connection devices including wavelength converters and/or data regenerators; and
    a plurality of bi-directional passive optical access connections between the metro connection devices of the ring-shaped metro core network and optical network units attached in each case via an optical splitter which communicate logically directly with the central management and switching center via a time division multiplex operation for passive optical networks,
    wherein the metro connection devices are adapted to, in each case, select, regenerate, and transmit one of the metro downstream signals as an access downstream signal on an access connection between the metro connection devices of an access connection and the optical network units, the access connection including no active components,
    wherein the optical network units are adapted to transmit access upstream signals having the same wavelengths or wavelengths that are selectable within a transmission band over the access connections, and
    wherein the metro connection devices are adapted to regenerate the access upstream signals and, in terms of the wavelengths, convert the access upstream signals into metro upstream signals and then transmit the metro upstream signals in the metro core network to the management and switching device.

2. Optical transmission system according to claim 1, wherein the metro core network is designed as a bi-directional ring network, in which the metro downstream signals and the corresponding metro upstream signals are transmitted with different wavelengths.

3. Optical transmission system according to claim 1, wherein the metro core network is designed as a unidirectional ring network, in which the metro downstream signals and the corresponding metro upstream signals are transmitted with different wavelengths.

4. Optical transmission system according to claim 1, wherein the metro core network is constructed as a one or two-phase ring network with a protection function.

5. Optical transmission system according to claim 1, wherein on all access connections between the optical network units and the metro connection devices, access upstream signals and/or access downstream signals with unified wavelengths are transmitted.

6. Optical transmission system according to claim 1, wherein the metro connection device features wavelength converters for signals allocated to a number of different services, which are transmitted in the metro network over different wavelengths in each case and over access connections in each case as signals with the same wavelengths in all access connections in the wavelength multiplex operation.

7. Optical transmission system according to claim 2, wherein an access connection between a metro connection device and a splitter is instantiated through a single optical fiber, over which bi-directional signals are transmitted.

8. Optical transmission system according to claim 1, wherein the metro core network is constructed as a ring network or a mesh network, and that protection connections within the metro network are attachable to the metro connection device with a second optical fiber.

9. Optical transmission system according to claim 1, wherein the management and switching center is connected with the metro connection devices by at least one thread without an interim amplifier.

10. Optical transmission system according to claim 1, wherein the access connections between metro connection devices and network units are free from elements necessitating electrical energy.

* * * * *